(12) United States Patent
Guan

(10) Patent No.: US 12,498,570 B2
(45) Date of Patent: Dec. 16, 2025

(54) NEAR-TO-EYE DISPLAY DEVICE

(71) Applicant: Chundong Guan, Jilin (CN)

(72) Inventor: Chundong Guan, Jilin (CN)

( * ) Notice: Subject to any disclaimer, the term of this patent is extended or adjusted under 35 U.S.C. 154(b) by 413 days.

(21) Appl. No.: 18/019,241

(22) PCT Filed: Jul. 29, 2021

(86) PCT No.: PCT/CN2021/109195
§ 371 (c)(1),
(2) Date: Feb. 1, 2023

(87) PCT Pub. No.: WO2022/028301
PCT Pub. Date: Feb. 10, 2022

(65) Prior Publication Data
US 2023/0288707 A1    Sep. 14, 2023

(30) Foreign Application Priority Data
Aug. 2, 2020   (CN) .......................... 202010764316.3

(51) Int. Cl.
*G02B 27/01* (2006.01)
*G02B 27/30* (2006.01)
(52) U.S. Cl.
CPC ......... *G02B 27/0172* (2013.01); *G02B 27/30* (2013.01)
(58) Field of Classification Search
CPC ........................... G02B 27/0172; G02B 27/30
See application file for complete search history.

(56) References Cited

U.S. PATENT DOCUMENTS

| 2014/0118829 A1 | 5/2014 | Ma et al. |
| 2017/0139213 A1 | 5/2017 | Schmidtlin |
| 2019/0219827 A1* | 7/2019 | Park ....................... B60K 37/00 |

(Continued)

FOREIGN PATENT DOCUMENTS

| CN | 101405637 A | 4/2009 |
| CN | 110308554 A | 10/2019 |

(Continued)

OTHER PUBLICATIONS

Joshua Ratcliff et al., "Thin VR: Heterogeneous microlens arrays for compact, 180 degree FOV VR near-eye displays", in IEEE Transactions on Visualization and Computer Graphics, vol. 26, No. 5, pp. 1981-1990, May 2020.

*Primary Examiner* — Collin X Beatty

(57) ABSTRACT

A near-to-eye display device includes a display image source (01) which includes an electronic display and is used for generating image light; an collimating device (02) which includes a microlens array including refraction microlens units having approximately the same focal length, wherein a distance between the collimating device (02) and the display image source (01) is approximately the focal length of the refraction microlens units, the collimating device (02) is used for collimating the image light emitted by the display image source (01); and a light control assembly (03) which includes light refraction microprism units having a one-to-one correspondence to the refraction microlens units each of which has a planar surface, the light control assembly is used for controlling a propagation direction of the image light. The refraction microlens units and the light refraction microprism units are arranged with a filling coefficient as close to 1 as possible.

8 Claims, 8 Drawing Sheets

(56) References Cited

U.S. PATENT DOCUMENTS

2020/0310120 A1\* 10/2020 Grief ................. G02B 26/0833
2022/0043267 A1\* 2/2022 Hudman ........... G02F 1/133526

FOREIGN PATENT DOCUMENTS

| CN | 110376742 A | | 10/2019 | | |
|----|---|---|---|---|---|
| EP | 3525034 A1 | \* | 8/2019 | ......... | G02B 27/0018 |
| GB | 2540922 A | \* | 2/2017 | ............. | G06T 5/006 |

\* cited by examiner

NEAR-TO-EYE DISPLAY DEVICE

BACKGROUND OF THE PRESENT INVENTION

Field of Invention

The present invention relates to an optical display device used in computer equipment, and more particularly to an imaging system for a near-to-eye display device.

Description of Related Arts

In recent years, head-mounted computer equipment has developed rapidly. VR (virtual reality), AR (augmented reality) and MR (mixed reality) devices emerge in endlessly. However, the optical structure of most existing VR display devices restricts the further reduction of their volume.

This situation limits the development and popularity of VR display devices.

Therefore, a lightweight, inexpensive, simple manufacturing process and large field of view optical device is needed.

SUMMARY OF THE PRESENT INVENTION

An object of the present invention is to provide an optical device which is able to resolve the above problem. Through an optical device which includes a collimating device and a light control assembly both of which have a specific structure, the VR equipment is reduced in volume and low in cost, and is easy to popularize.

Accordingly, a near-to-eye display device comprises a display image source, a collimating device and a light control assembly.

Preferably, the display image source is an OLED (organic light-emitting diode) display, an LCD (liquid crystal display) or a micro-LED display.

Preferably, when refraction microlens units of the collimating device are dynamic lenses or microlenses with electronically controlled focal length, the near-to-eye display device is able to better adapt to diopter of an observer's eyeball.

Preferably, the refraction microlens units of the collimating device are able to be instead with diffraction microlens units for collimating.

Preferably, the refraction microlens units of the collimating device have a one-to-one correspondence with pixel units of the display image source.

Preferably, the refraction microlens units of the collimating device and light refraction microprism units of the light control assembly need to be arranged with a filling coefficient as close to 1 as possible; the refraction microlens units of the collimating device have a one-to-one correspondence with the light refraction microprism units of the light control assembly; and a shape of vertical projections of the light refraction microprism units of the light control assembly on the display image source is approximately the same as that of the refraction microlens units of the collimating device on the display image source.

Preferably, a deflection angle, of the light refraction microprism units of the light control assembly to the image light which is perpendicular to a plane where the display image source is provided after being collimated by the collimating device, should increases with an increase of a distance between the light refraction microprism units and an optical axis of the light control assembly.

Preferably, under a premise of satisfying the above conditions, an arrangement of two adjacent light refraction microprism units of the light control assembly should satisfy a condition that virtual images formed by the image light outputted by the two adjacent light refraction microprism units of the light control assembly do not overlap when an observer observes.

Preferably, both the collimating device and the light control assembly are made of plastic or glass materials.

It should be understood that the foregoing general description and the subsequent detailed description are illustrative and explanatory, and are not a limitation on the protection scope of the present invention.

BRIEF DESCRIPTION OF THE DRAWINGS

The drawings provided by present invention, together with embodiments given above and detailed description given below, are used to explain the functions and advantages of the present invention.

DETAILED DESCRIPTION OF THE PREFERRED EMBODIMENT

The purposes and functions of the present invention and the methods for achieving these purposes and functions will be clarified by reference to exemplary embodiments. However, the present invention is not limited to the demonstrative embodiments disclosed below and may be realized in various forms. The essence of the specification is merely to assist those skilled in the art to comprehensively understand the specific details of the present invention.

Figure 1:
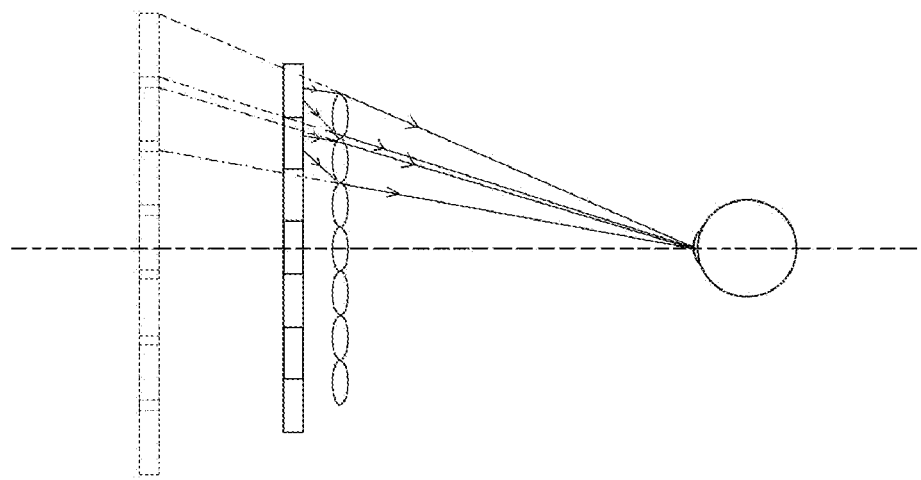
FIG. 1 is a structural schematic diagram of a near-to-eye display device of a prior art.

In the conventional virtual reality display device, if the microlens array shown in FIG. 1 is used as the collimating lens of the image light, the virtual images formed by the image light of two adjacent refraction microlens units will inevitably overlap or mix colors, which makes it impossible for observers to observe clear virtual images.

Figure 2:
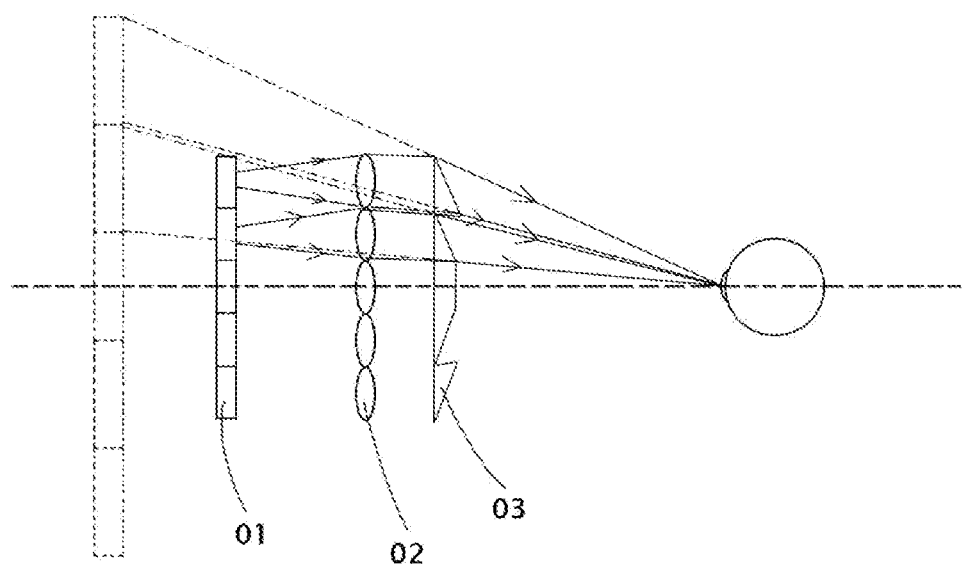
FIG. 2 is a structural schematic diagram of a near-to-eye display device provided by the present invention.

FIG. 2 is a structural schematic diagram of a near-to-eye display device, in which a collimating device 02 is located between a display image source 01 and a light control assembly 03, and a distance between the collimating device 02 and the display image source 01 is approximately a focal length of refraction microlens units of the collimating device 02. Moreover, an optical axis of the display image source 01 is coincident with an optical axis of the collimating device 02 and an optical axis of the light control assembly 03. A shape of vertical projections of light refraction microprism units of the light control assembly 03 on the display image source 01 is approximately the same as that of the refraction microlens units of the collimating device 02 on the display image source 01.

And pixel units of the display image source 01 have a one-to-one correspondence with the refraction microlens units of the collimating device 02 and the light refraction microprism units of the light control assembly 03. At the same time, the refraction microlens units of the collimating device 02 and the light refraction microprism units of the light control assembly 03 need to be arranged with a filling coefficient as close to 1 as possible.

In practical applications, due to different eye diopters of different observers, the distance between the collimating device 02 and the display image source 01 is able to be dynamically adjusted, or the focal length of the collimating device 02 is able to be dynamically adjusted by using a liquid crystal panel capable of realizing the function of the collimating device 02.

It should be understood that the manner of one-to-one correspondence between the pixel units of the display image source 01 and the refraction microlens units of the collimating device 02 is not a necessary condition for practical applications. For example, when a static segment LCD (liquid crystal display) is used as the display image source, the static segment LCD itself does not involve the pixel concept in the general sense, so it is impossible to meet the above one-to-one corresponding condition. However, at this time, focuses of the refraction microlens units of the collimating device 02 on the static segment LCD are still able to be regarded as the pixel units of the display image source 01.

Also, when the present invention is applied to a light field display, the collimating device 02 corresponds to a pixel of the display image source no longer, but a pixel island including multiple pixels.

Figure 3:
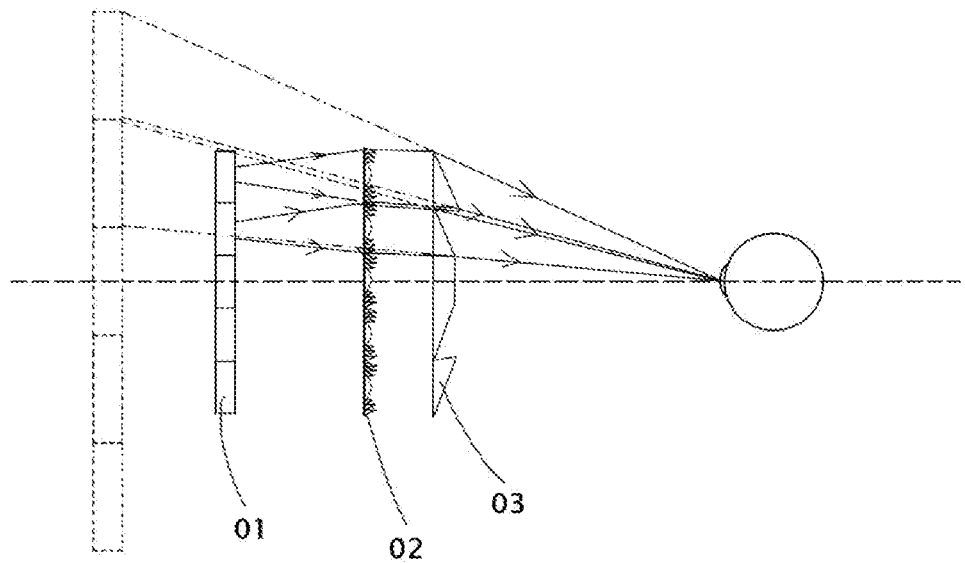
FIG. 3 is a structural schematic diagram of a near-to-eye display device including a collimating device which includes diffraction microlens units provided by the present invention.

For the aforementioned embodiment, the microlens units of the collimating device 02 are not only refraction microlens units in FIG. 2, but diffraction microlens units with the same collimating function in FIG. 3.

Figure 4:
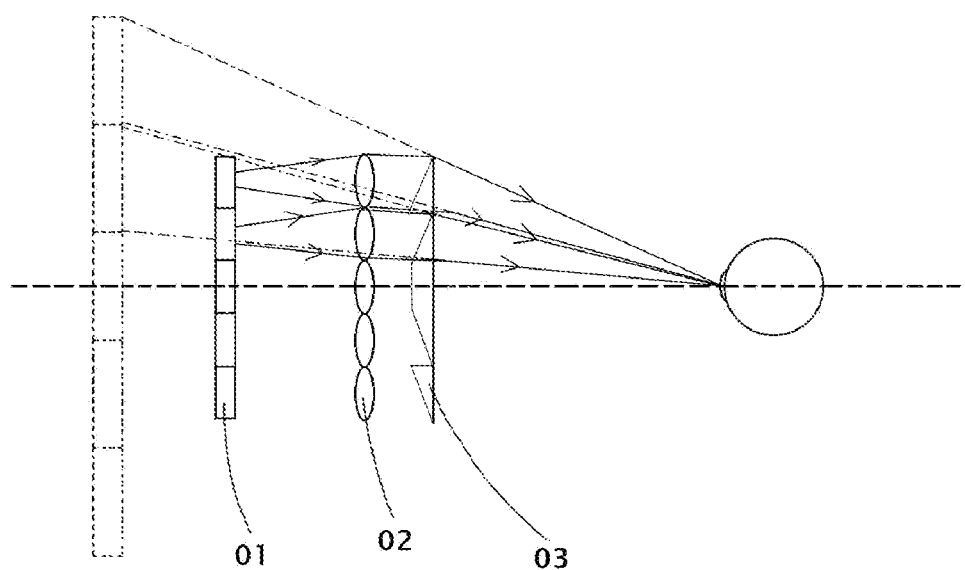
FIG. 4 is another structural schematic diagram of a near-to-eye display device provided by the present invention.

The collimating device 02 and the light control assembly 03 are able to be made of plastic or glass materials FIG. 4 is another structural schematic diagram of the near-to-eye display device, which shows another arrangement of the light control assembly 03, and at this time, the light refraction microprism units of the light control assembly 02 also have the function of adjusting the deflection angle of the image light.

Figure 5:
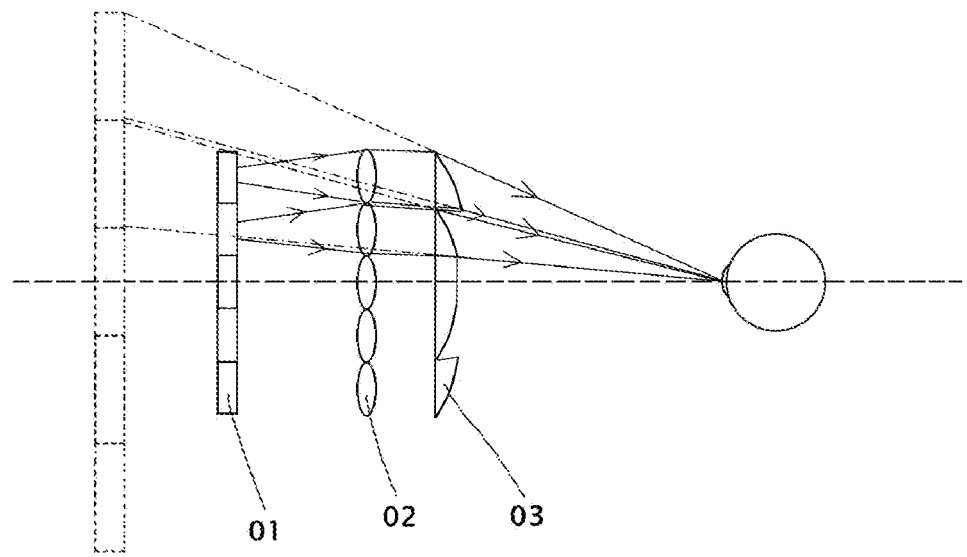
FIG. 5 is a structural schematic diagram of a light control assembly including light refraction microprism units each of which has a nonplanar surface.
Figure 6:
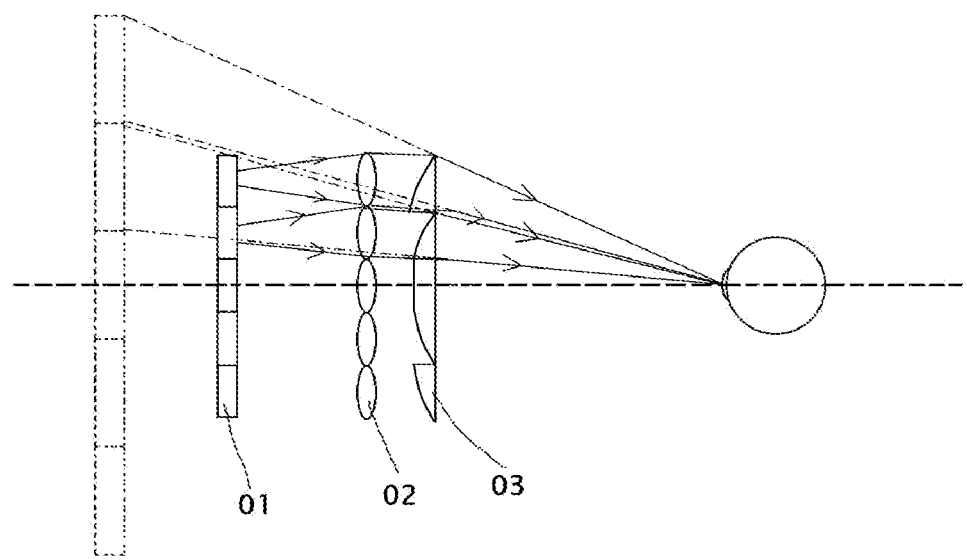
FIG. 6 is another structural schematic diagram of the light control assembly including light refraction microprism units each of which has a nonplanar surface.

FIGS. 5 and 6 show two situations when the light refraction microprism units of the light control assembly 03 have a non-planar surface. The function of this non-planar surface is to correct the aberration of the virtual image formed by the aforementioned image light, so that the observer is able to see a more accurate virtual image.

Figure 7:
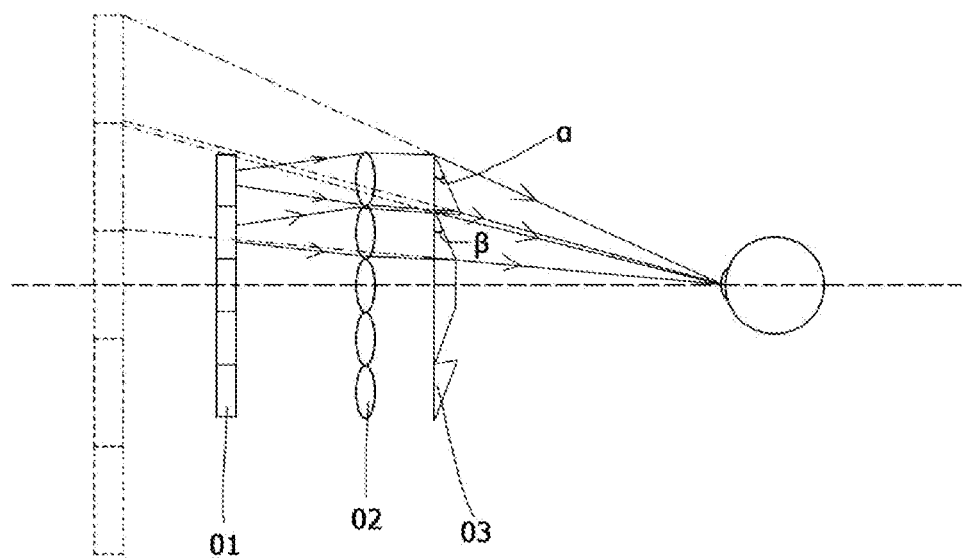
FIG. 7 is a planar diagram which shows the principle that the image light is controlled to deflect by two light refraction microprism units which are adjacent to an optical axis of the light control assembly.

Two adjacent light refraction microprism units of the light control assembly 03 are capable of deflecting the image light from the display image source 01 that is collimated by the refraction microlens units of the collimating device 02. In addition, the deflection angle of the aforementioned image light increases with the increase of the distance between the light refraction microprism units and the optical axis of the light control assembly 03. Take two light refraction microprism units of the light control assembly 03 in FIG. 7 as an example, an angle between a working surface of one light refraction microprism unit which is away from the optical axis of the light control assembly 03 and a plane where the light control assembly 03 is located should be greater than an angle between a working surface of another light refraction microprism unit which is near the optical axis of the light control assembly 03 and the plane where the light control assembly 03 is located, that is, $\alpha > \beta$ is satisfied.

At the same time, the deflection angle of the light refraction microprism units of the light control assembly 03 to the aforementioned image light needs to satisfy a condition that the virtual images formed by the image light outputted by the two adjacent light refraction microprism units of the light control assembly 03 do not overlap when the observer observes.

Under the existing technical conditions, the collimating device 02 and the light control assembly 03 are able to be made of plastic or glass materials.

Figure 8:
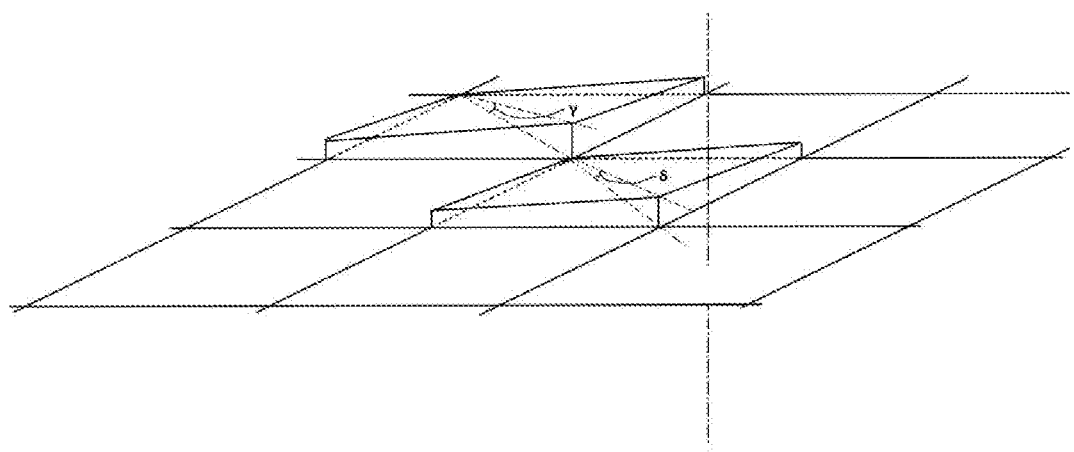
FIG. 8 is a stereoscopic diagram which shows the principle that the image light is controlled to deflect by two light refraction microprism units which are adjacent to the optical axis of the light control assembly and each of which has a planar surface.

FIG. 8 shows the arrangement requirement that the light refraction microprism units of the aforementioned the light control assembly 03, in which the light control assembly 03 has a planar surface in a stereoscopic manner, that is, $\gamma > \delta$.

Figure 9:
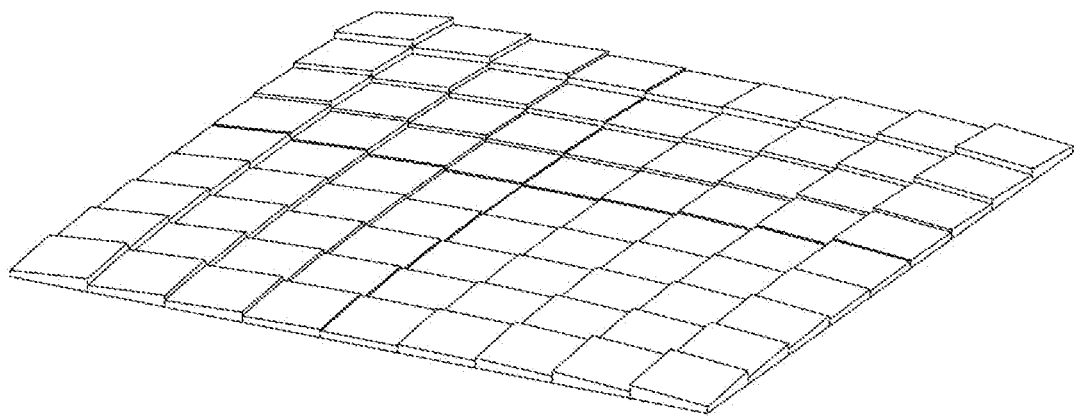
FIG. 9 is a stereoscopic diagram which shows that 9×9 light refraction microprism units of the light control assembly each of which has a planar surface are arranged in a square manner, in which an optical axis of one of the 9×9 light refraction microprism units which is located at a middle of the 9×9 light refraction microprism units is an optical axis of the light control assembly.

In order to facilitate understanding of the specific intent of the present invention, FIG. 9 is a stereoscopic diagram which shows that 9×9 light refraction microprism units of the light control assembly 03 each of which has a planar surface are arranged in a square manner, in which an optical axis of one of the 9×9 light refraction microprism units which is located at a middle of the 9×9 light refraction microprism units is an optical axis of the light control assembly 03.

Figure 10:
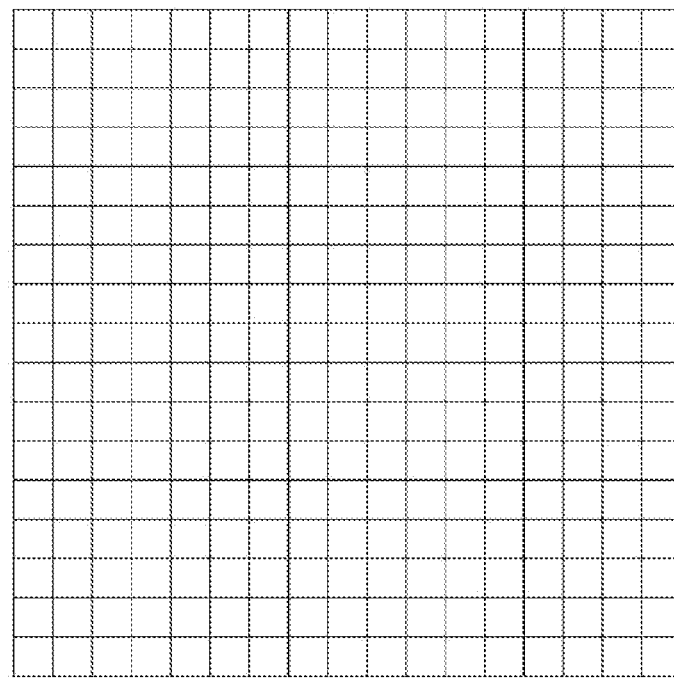
FIG. 10 is a distribution diagram of refraction microlens units of the collimating device and the light refraction microprism units of the light control assembly.
Figure 11:
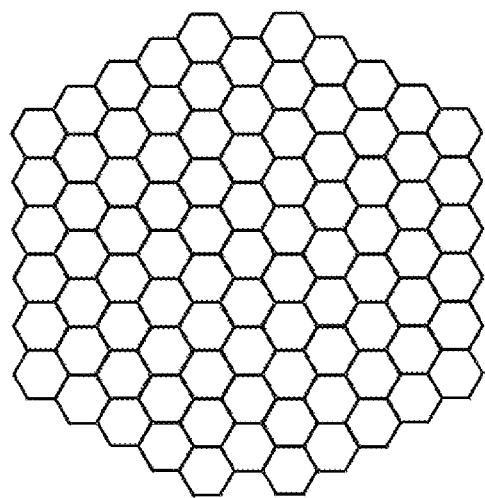
FIG. 11 is another distribution diagram of refraction microlens units of the collimating device and the light refraction microprism units of the light control assembly.

Referring to FIGS. 10 and 11, the refraction microlens units of the collimating device 02 and the corresponding light refraction microprism units of the light control assembly 03 are able to be arranged in a square or regular hexagon manner in practical applications, that is, it is necessary to obtain a filling coefficient as close to 1 as possible to improve the utilization efficiency of image light. Obviously, in practical applications, the rectangular arrangement and the equilateral triangle arrangement are also feasible.

Figure 12:
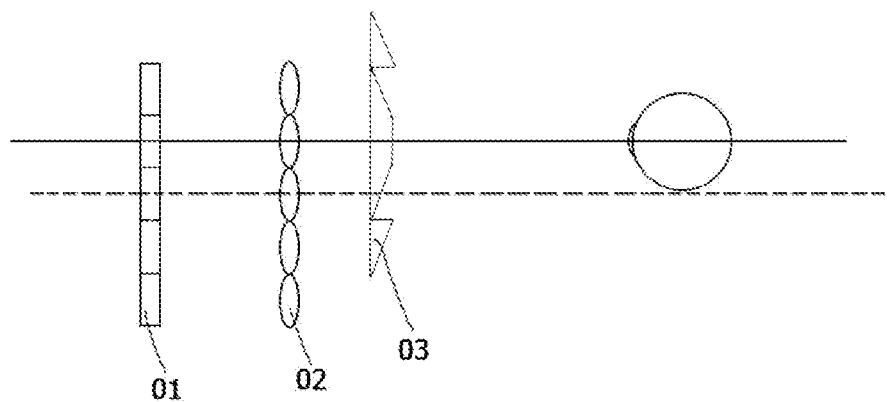
FIG. 12 is a schematic diagram which shows that the deflection angle of the image light outputted by the light refraction microprism units is dynamically adjusted by the light refraction microprism units of the light control assembly.

Referring to FIG. 12, the optical axis of the light control assembly 03 is consistent with the optical axis of the observer's eyeball, and simultaneously it is necessary to ensure that the light refraction microprism units of the light control assembly 03 still have a one-to-one correspondence with the refraction microlens units of the collimating device 02. Therefore, under the above conditions, a quantity of the light refraction microprism units of the light control assembly 03 should be greater than a quantity of the refraction microlens units of the collimating device 02, and a dynamic adjustment amplitude of the light control assembly 03 should be minimized by a size of the light refraction microprism units of the light control assembly 03, so that at this time, the deflection angle of the emitted image light is dynamically adjusted by the light refraction microprism units of the light control assembly 03.

Figure 13:
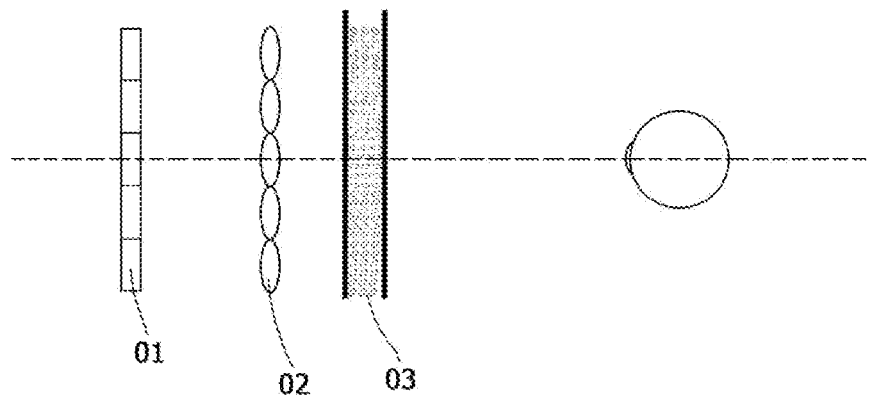
FIG. 13 is another schematic diagram which shows that the deflection angle of the image light outputted by the light refraction microprism units is dynamically adjusted by the light refraction microprism units of the light control assembly.

Referring to FIG. 13, the light refraction microprism units of the light control assembly 03 are embodied as liquid crystal devices, so that at this time, without moving the light control assembly 03, the deflection angle of the emitted image light is dynamically adjusted by the light refraction microprism units of the light control assembly 03.

Figure 14:
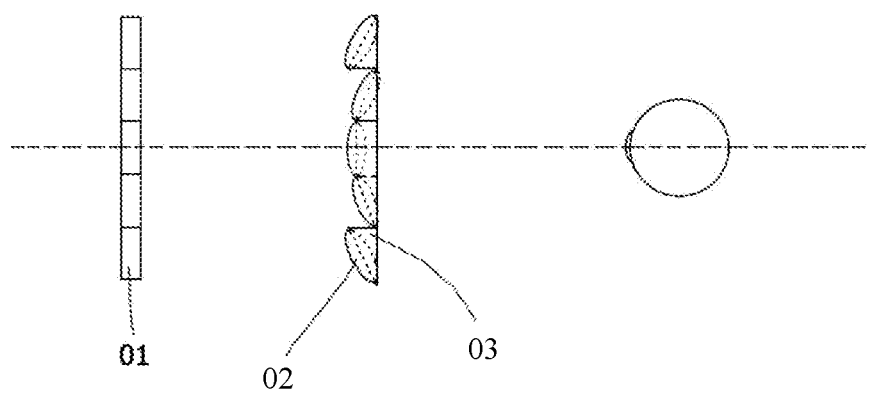
FIG. 14 shows a positional relationship between the collimating device and the light control assembly.

Referring to FIG. 14, in order to simplify the components, the refraction microlens units of the collimating device 02 are attached to a surface of the light refraction microprism units of the light control assembly 03 respectively. It should be noted that, in practice, the focal length of the refraction microlens units of the collimating device 02 may be less than a thickness of a substrate, so for high-resolution applications, a surface of the substrate with the collimating device 02 and the light control assembly 03 after processing should face away from the observer's eyeball, so as to ensure that the distance between the collimating device 02 and the display image source 01 is approximately the focal length of the refraction microlens units of the collimating device 02. And for some application scenarios with low resolution, especially when the focal length of the refraction microlens units of the collimating device 02 is greater than the thickness of the substrate, the surface of the substrate with the collimating device 02 and the light control assembly 03 faces away from the display image source 01 according to the actual situation.

Figure 15:
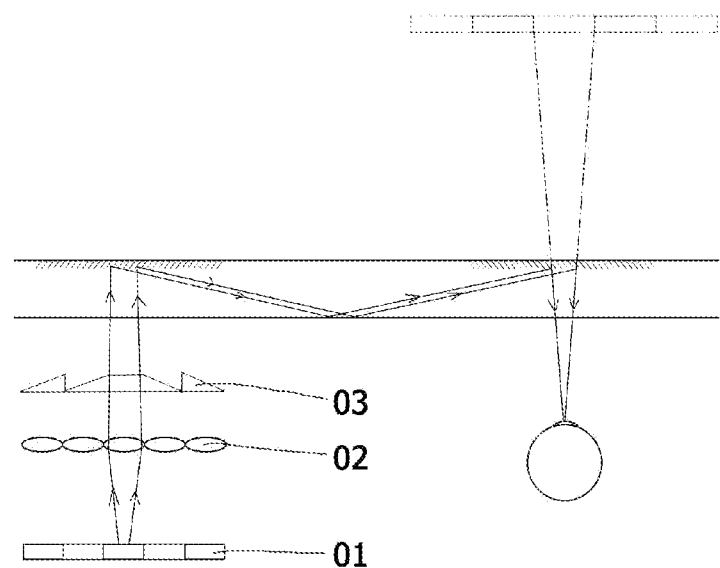
FIG. 15 shows an application that the near-to-eye display device provided by the present invention is in combination with an optical waveguide substrate.

FIG. 15 shows the combination of the near-to-eye display device provided by the present invention with an optical waveguide device. The image light outputted by the display image source 01, after being collimated by the collimating device 02 and being adjusted in the deflection angle by the light refraction microprism units of the light control assembly 03, falls into an optical waveguide substrate, and then is emitted by the optical waveguide substrate, and finally enters the human eye. This application method combines the volume advantage of the near-to-eye display device provided by the present invention with the light and thin advantage of the optical waveguide substrate, so as to realize the design of lighter AR (augmented reality) glasses.

It should be understood that the aforementioned optical waveguide device is only an illustrative example, and the present invention is also applicable to other existing optical waveguide devices.

What is claimed is:

1. A near-to-eye display device, which comprises:
a display image source (1) which comprises an electronic display for generating image light;
an collimating device (02) which comprises a microlens array comprising refraction microlens units having approximately a same focal length, wherein a distance between the collimating device (02) and the display image source (01) is approximately the focal length of the refraction microlens units of the collimating device (02), the collimating device (02) is for collimating the image light emitted by the display image source (01); and
a light control assembly (03) which comprises light refraction microprism units, wherein the light refraction microprism units, each of which has a planar surface, have a one-to-one correspondence with the refraction microlens units of the collimating device (02); the light control assembly is for controlling a propagation direction of the image light through refraction on a working surface, wherein:
the refraction microlens units of the collimating device (02) and light refraction microprism units of the light control assembly (03) are arranged with a filling coefficient as close to 1 as possible;
a shape of vertical projections of the light refraction microprism units of the light control assembly (03) on the display image source (01) is approximately the same as that of the refraction microlens units of the collimating device (02) on the display image source (01);
the planar surfaces of two adjacent light refraction microprism units of the light control assembly (03) deflect the image light from the display image source (01) that is collimated by the refraction microlens units of the collimating device (02);
an arrangement of the two adjacent light refraction microprism units of the light control assembly (03) satisfies a condition that virtual images formed by image light outputted by the two adjacent light refraction microprism units of the light control assembly (03) do not overlap when an observer observes; and
the light refraction microprism units of the light control assembly (03) are liquid crystal devices, which are configured to adjust a deflection angle of the image light emitted by the display image source (01) without moving the light control assembly (03).

2. The near-to-eye display device according to claim 1, wherein the collimating device (02) is located between the display image source (01) and the light control assembly (03).

3. The near-to-eye display device according to claim 1, wherein a focus length of the refraction microlens units of the collimating device (02) is variable.

4. The near-to-eye display device according to claim 1, wherein the refraction microlens units of the collimating device (02) have a one-to-one correspondence with pixel units of the display image source (01).

5. The near-to-eye display device according to claim 1, wherein the deflection angle of the image light from the display image source (01) is dynamically adjusted by the light refraction microprism units of the light control assembly (03).

6. The near-to-eye display device according to claim 1, wherein each of the light refraction microprism units of the light control assembly (03) has a nonplanar surface.

7. The near-to-eye display device according to claim 1, wherein the refraction microlens units of the collimating device (02) are attached to a surface of the light refraction microprism units of the light control assembly (03).

8. The near-to-eye display device according to claim 1, wherein image light outputted by the light control assembly (03) enters a human eye after passing through an optical waveguide substrate.

* * * * *